United States Patent
Jang et al.

(10) Patent No.: US 8,984,518 B2
(45) Date of Patent: Mar. 17, 2015

(54) APPARATUS AND METHOD FOR EXECUTING COMPONENTS BASED ON THREAD POOL

(75) Inventors: Choul Soo Jang, Daejeon (KR); Seung-Woog Jung, Daejeon (KR); Byoung Youl Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 310 days.

(21) Appl. No.: 13/273,949

(22) Filed: Oct. 14, 2011

(65) Prior Publication Data

US 2012/0096471 A1 Apr. 19, 2012

(30) Foreign Application Priority Data

Oct. 14, 2010 (KR) .................. 10-2010-0100334
Mar. 9, 2011 (KR) .................. 10-2011-0020925

(51) Int. Cl.
*G06F 9/46* (2006.01)
*G06F 9/50* (2006.01)
*G06F 11/07* (2006.01)

(52) U.S. Cl.
CPC .......... *G06F 9/5027* (2013.01); *G06F 11/0715* (2013.01); *G06F 11/0757* (2013.01); *G06F 2209/5018* (2013.01)
USPC ....................................... 718/102

(58) Field of Classification Search
None
See application file for complete search history.

(56) References Cited

U.S. PATENT DOCUMENTS

| | | | | |
|---|---|---|---|---|
| 5,355,484 A | * | 10/1994 | Record et al. | 717/127 |
| 6,266,666 B1 | * | 7/2001 | Ireland et al. | 707/770 |
| 6,748,556 B1 | | 6/2004 | Storino et al. | |
| 7,765,550 B2 | * | 7/2010 | Gootherts et al. | 718/103 |
| 2006/0010352 A1 | * | 1/2006 | Mukherjee et al. | 714/47 |
| 2009/0241120 A1 | * | 9/2009 | Nam et al. | 718/103 |
| 2010/0115524 A1 | * | 5/2010 | Jang et al. | 718/103 |
| 2010/0161836 A1 | * | 6/2010 | Song et al. | 710/8 |

FOREIGN PATENT DOCUMENTS

| | | |
|---|---|---|
| KR | 10-0388550 | 6/2003 |
| KR | 1020080073414 | 8/2008 |
| KR | 10-0877715 | 1/2009 |

* cited by examiner

*Primary Examiner* — Emerson Puente
*Assistant Examiner* — Sisley Kim
(74) *Attorney, Agent, or Firm* — Nelson Mullins Riley & Scarborough LLP; Anthony A. Laurentano, Esq.; Dipti Ramnarain, Esq.

(57) ABSTRACT

An apparatus for executing components based on a thread pool includes a component executor configured to have a set priority and period, to register components having the set priority and period, and to execute the registered components. Further, the apparatus for executing the components based on the thread pool includes a thread pool configured to allocate a thread for executing the component executor; and an Operating System (OS) configured to create an event for allocating the thread to the component executor in each set period.

10 Claims, 4 Drawing Sheets

APPARATUS AND METHOD FOR EXECUTING COMPONENTS BASED ON THREAD POOL

CROSS-REFERENCE TO RELATED APPLICATION(S)

The present invention claims priority of Korean Patent Application No. 10-2010-0100334, filed on Oct. 14, 2010, and Korean Patent Application No. 10-2011-0020925, filed on Mar. 9, 2011, which are incorporated herein by references.

FIELD OF THE INVENTION

The present invention relates to preventing software components for a robot from failing during execution; and, more particularly, to an apparatus and method for executing components based on a thread pool, which can prevent a failure of a specific component from expanding to a system-wide failure when a multiple component is executed using a component execution technique for running combined software components for a robot in a distributed environment.

BACKGROUND OF THE INVENTION

A software component for a robot is a reusable and replaceable software module. A user who uses external components configures a robot application using only a combination of components and an interface provided by the components without needing to know the detailed implementation of the interface.

Robot components used in a robot software structure have respective internal states, and operate in an active manner. The robot is controlled by the exchange of data between the components and method calling via a component interface. In order to support this characteristic of the robot, recently, Open RObot Control Software (OROCOS) and a Robot Technology Component (RTC) have presented robot programming methods using components in an active pattern.

In order to run the software components for a robot, components are executed at given periods using the threads of an Operating System (OS). Meanwhile, the number of components used is inevitably large because a robot uses a variety of devices and algorithms. In this case, if a thread is allocated to each of the components, the system resources of the OS are not only wasted, but a thread context exchange process is also performed frequently, thereby deteriorating system performance.

In the prior art, such as OROCOS, components having the same period are made to be processed using a single thread to prevent the deterioration of system performance attributable to the allocation of a thread to each component.

When a plurality of components is processed using a single thread as described above, components registered with a corresponding thread are sequentially processed in each period.

However, if a failure has occurred in a specific component while components registered with a thread were being sequentially processed or if all the components have not been executed within a specific period because the time taken to execute the components was long, the execution of the other components is obstructed. Accordingly, the operation of the entire robot system becomes abnormal due to the failure of the specific component.

In order to solve this problem, in the prior art, a monitor for monitoring the execution of components is added to a system. Furthermore, if the monitor detects abnormality in the execution of a component, a new thread is created and components registered with the new thread are separately executed to prevent a failure in one component from generating an abnormality in the entire system.

However, the prior art in which the monitor is added to the system requires the additional process of sending the execution state of a component to the monitor every time, thereby deteriorating overall system performance.

SUMMARY OF THE INVENTION

In view of the above, the present invention provides an apparatus and method for executing components based on a thread pool, which are capable of preventing a failure of a specific component from expanding to a system-wide failure while maintaining system performance without requiring additional communication, such as communication with a monitor, when a multiple software component for a robot is executed.

In accordance with a first aspect of the present invention, there is provided an apparatus for executing components based on a thread pool, the apparatus including: a component executor configured to have a set priority and period, to register components having the set priority and period, and to execute the registered components; a thread pool configured to allocate a thread for executing the component executor; and an Operating System (OS) configured to create an event for allocating the thread to the component executor in each set period.

In accordance with a second aspect of the present invention, there is provided a method of executing components based on a thread pool, the method including: creating a component executor having a preset priority and period; registering components having the priority and period set for the component executor; sequentially executing the registered components when a thread is allocated by a thread pool; and returning the allocated thread when the execution of the registered components has been completed.

In accordance with the apparatus and method for executing the components based on the thread pool of the embodiment of the present invention, one or more previously registered components are executed based on a thread allocated by the thread pool and information about the components being executed is stored in the memory. When the execution of the components has been completed, the information stored in the memory is deleted. When a new thread is allocated by the thread pool, whether a failure has occurred in the components is determined based on the presence or absence of the information stored in the memory. Accordingly, when software components for a robot are executed, system performance can be maintained without requiring additional communication, such as communication with a monitor, and a failure of a specific component can be prevented from expanding to a system-wide failure.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
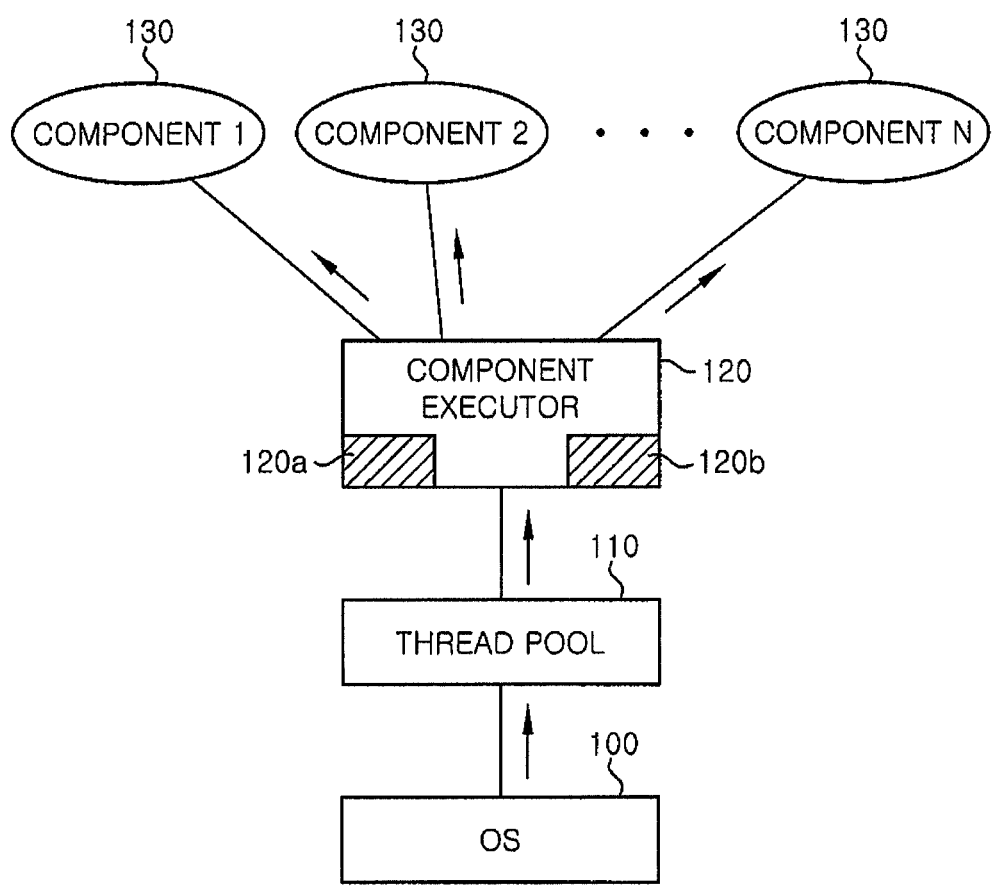
FIG. 1 is a block diagram showing an apparatus for executing components based on a thread pool during the execution of software components for a robot in accordance with an embodiment of the present invention.

FIG. 1 is a block diagram showing an apparatus for executing components based on a thread pool during the execution of software components for a robot in accordance with an embodiment of the present invention.

Referring to FIG. 1, a failure prevention apparatus in accordance with the embodiment of the present invention includes an OS 100, a thread pool 110, a component executor 120, and a plurality of components 130. The component executor 120 includes internal memory 120a for storing information about executed components and a counter 120b for supporting failure diagnosis.

The thread pool 110 creates the component executor 120, and allocates a thread for executing the components 130 to the created component executor 120.

The component executor 120 has a specific priority and period. The component executor 120 registers the components 130 having the same priority and period, and executes the registered components 130 when a thread is allocated to the registered components 130.

Furthermore, the component executor 120 sets a timer for the OS 100 in each set period. When the timer is driven, the OS 100 creates a timer event, and provides the created timer event to the thread pool 110. The thread pool 110 uses the timer event to allocate the thread to the component executor 120.

When the execution of the registered components 130 has been completed, the component executor 120 returns the thread to the thread pool 110, and store information about the components 130 to be executed in internal memory 120a. When the execution of the components 130 has completed, the component executor 120 deletes the information stored in the internal memory 120a.

As described above, the component executor 120 determines whether a failure has occurred in a specific component 130 based on information stored in the internal memory 120a. That is, if a failure has occurred in a specific component 130 while registered components 130 were being executed (i.e., if the execution of the registered components 130 has not been completed within a predetermined period because the time taken to execute the specific component 130 was long), the component executor 120 increments the counter 120b when the predetermined period has been completed and then returns a thread, allocated thereto, to the thread pool 110.

Meanwhile, the thread allocated by the thread pool 110 determines whether a failure has occurred in the specific component 130 based on information stored in the internal memory 120a of the component executor 120 and the counter value of the counter 120b.

The thread which has determined whether a failure has occurred in the specific component 130 newly creates a component executor 120 having the same priority and period as the component executor 120 registered by the specific component 130. The newly created component executor 120 registers the components 130, other than the specific component 130, and sequentially executes the registered components 130 using the thread.

If a plurality of the component executors 120 exists, the priority and period set in each of the component executors 120 may be used by the scheduling policy of the OS 100.

A process in which the apparatus for executing components based on a thread pool operates to execute software components for a robot will now be described with reference to FIGS. 2 to 4.

Figure 2:
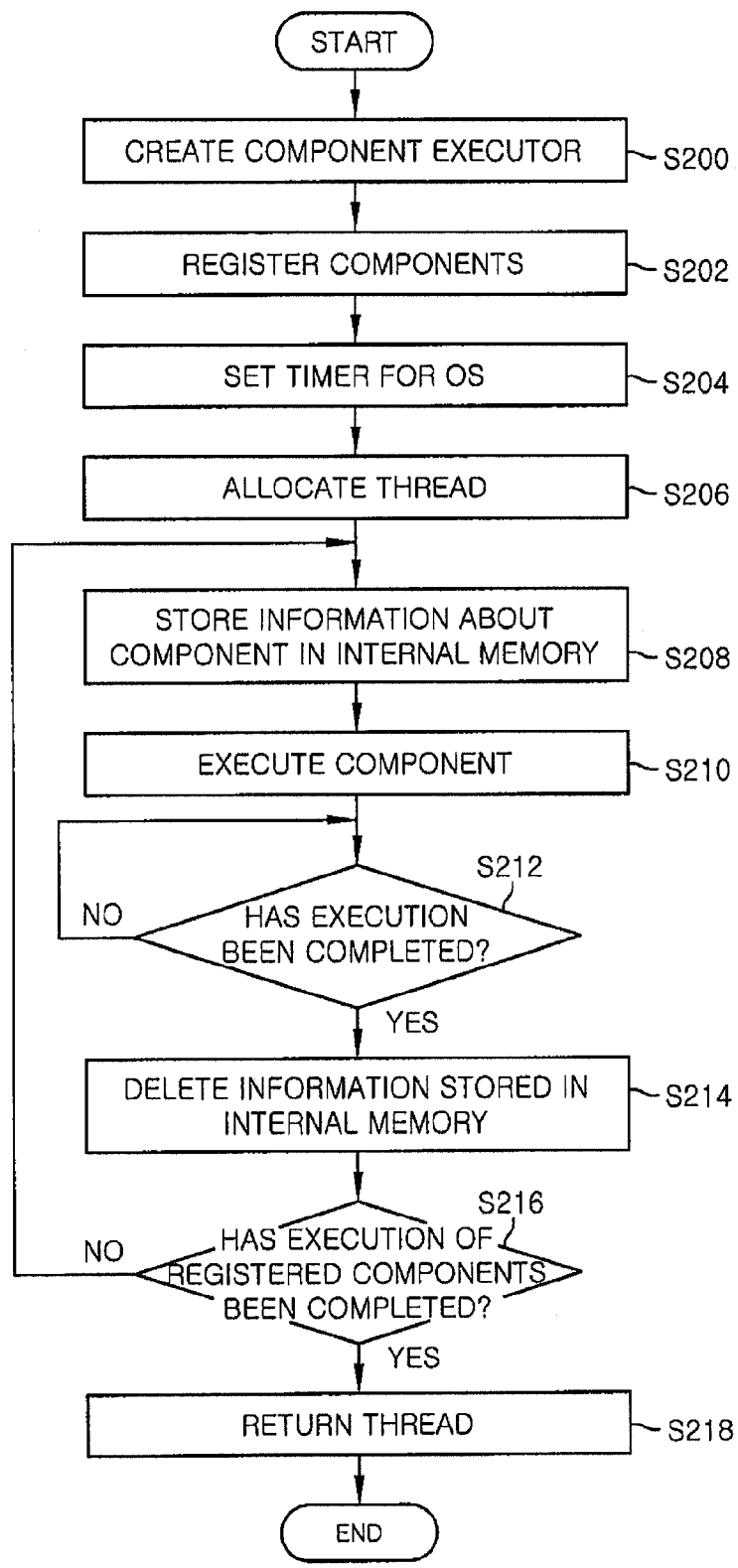
FIG. 2 is a flowchart illustrating a process in which a thread pool-based failure prevention apparatus operates to execute software components for a robot in accordance with an embodiment of the present invention.
Figure 3:
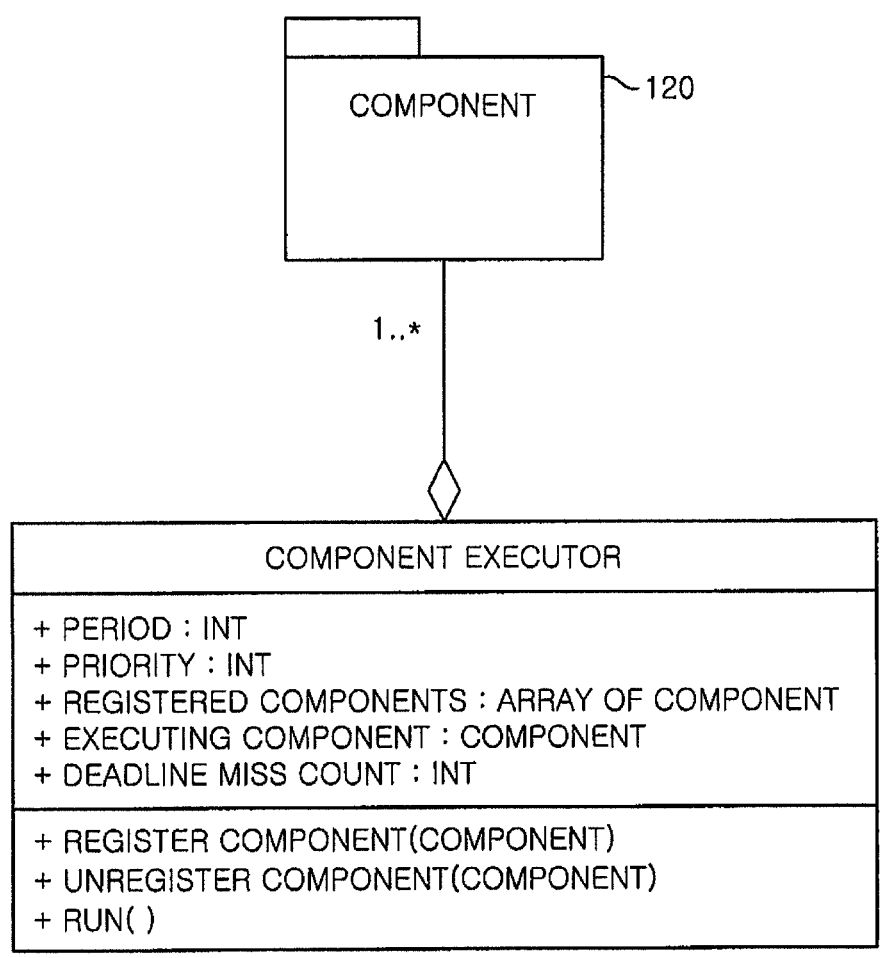
FIG. 3 is a class diagram showing the relationship between a component and the internal data structure of a component executor in accordance with an embodiment of the present invention.

FIG. 2 is a flow chart illustrating a process in which the apparatus for executing the components based on the thread pool operates to execute software components for a robot in accordance with the embodiment of the present invention; FIG. 3 is a class diagram showing the relationship between a component and the internal data structure of a component executor in accordance with the embodiment of the present invention; and FIG. 4 is a diagram illustrating a process of determining whether a failure has occurred when the component executor executes a component and then handling the failure in accordance with the embodiment of the present invention.

As shown in FIG. 2, first, the apparatus for executing the components based on the thread pool in the execution of the software components for a robot in accordance with the embodiment of the present invention creates the component executor 120 having a set priority and period in step S200. The component executor 120 registers the components 130 having the set priority and period in step S202.

Thereafter, the component executor 120 sets a timer for the OS 100 based on the execution period of the components in step S204. Accordingly, the OS 100 creates a timer event at each predetermined period, and provides the created time event to the thread pool 110.

The thread pool 110 allocates an available thread to the component executor 120 whenever the timer event is created in step S206, and executes the component executor 120.

The component executor 120 sequentially executes the registered components 130 using the allocated thread. The component executor 120 stores information about a specific component 130 to be executed in the internal memory 120a in step S208, and then executes the specific component 130 in step S210. In other words, when sequentially executing the components 130 using the thread allocated by the thread pool 110, the component executor 120 stores information about a component to be executed in the internal memory 120a of the component executor 120. After the execution of the component has been completed in step S212, the component executor 120 deletes the information stored in the internal memory 120a in step S214. The relationship between the internal data structure of the component executor 120 and the component may be represented by a class diagram as shown in FIG. 3.

When the execution of the registered components 130 has been completed by repeatedly performing the above steps in step S216, the component executor 120 returns the thread to the thread pool 110 in step S218 so that the thread can be reused later.

Meanwhile, if a failure has occurred in a specific component 130 (e.g., a component2) while the component executor 120 was executing the registered components or the execution of the registered components has not been completed within a predetermined period because the time taken to executed the specific component was long, the execution of other components may not be executed due to the specific component, thereby deteriorating overall system performance.

If the component executor 120 has not completed the execution of the specific component within the predetermined period as described above, a timer event is created in a subsequent period, and a new thread is allocated by the thread pool 110. When the new thread tries to run the component executor 120 that has not completed the execution of the specific component, whether the component executor 120 is being used by another thread is determined based on information about the specific component stored in the internal memory 120a of the component executor 120. If there is information about a component currently being executed, it is determined that the component executor 120 is being used by another thread. Then, a DeadlineMissCount within the component executor 120 is incremented by 1, the allocated thread is returned, and the process is terminated.

If the DeadlineMissCount reaches a value equal to or higher than a predetermined count after the above process has been repeated, the thread allocated by the thread pool 110 determines that a component corresponding to the information stored in the component executor 120 has failed.

Figure 4:
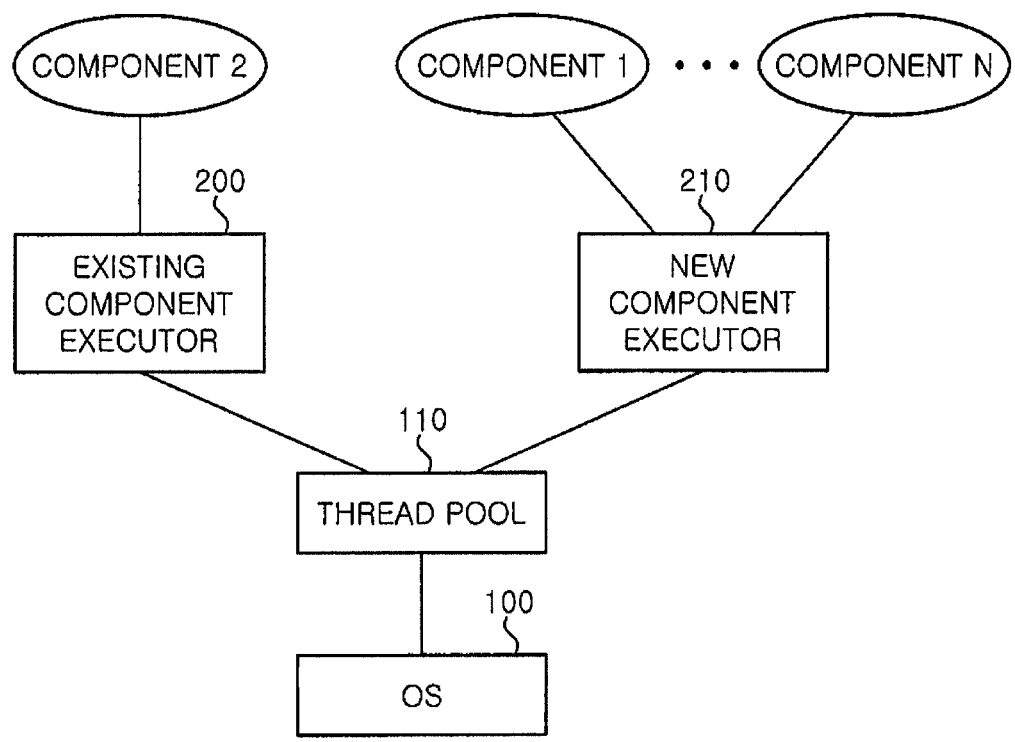
FIG. 4 is a diagram illustrating a process of determining whether a failure has occurred when the component executor executes a component and handling the failure in accordance with an embodiment of the present invention.

If it is determined that the component has failed as described above, the thread allocated by the thread pool 110 creates a new component executor having the same priority and period as shown in FIG. 4, and transfers components, other than the component currently being executed, to a new component executor 210 by registering them with the new component executor 210. The existing component executor 200 deletes the transferred components. The new component executor 210 sequentially executes the components according to the existing method continuously using the thread from which the existing component executor has been separated.

While the invention has been shown and described with respect to the embodiments, it will be understood by those skilled in the art that various changes and modifications may be made without departing from the scope of the invention as defined in the following claims.

What is claimed is:

1. An apparatus for executing components based on a thread pool, the apparatus comprising:
    create a component executor, using a processor, having a set priority and period;
    register components having the set priority and period set for the component executor;
    sequentially execute the registered components when a thread is allocated by the thread pool for a robot;
    an Operating System (OS) configured to create an event for allocating the thread to the component executor in each set period; and
    return the allocated thread when the execution of the registered components has been completed,
    wherein if the execution of the registered components did not complete within the set period:
        increment a counter and then returning the allocated thread;
        check a value of the counter using a new thread when the new thread is allocated to the component executor;
        determine a failed component based on the information stored in internal memory when the value of the counter is a value equal to or higher than a preset threshold value:
        create, in response to the determining of the failed component, a new component executor having the set priority and the set period using the new thread and transferring the components, and registering the components other than the failed component with the new component executor; and
        delete the transferred components by the component executor and execute the registered components using the new component executor.

2. The apparatus of claim 1, wherein:
    the component executor sets a timer for the OS in each set period; and
    the OS creates the event when the timer is actuated and provides the created event to the thread pool.

3. The apparatus of claim 1, wherein the component executor returns the allocated thread to the thread pool when the execution of the registered components has been completed.

4. The apparatus of claim 1, wherein the component executor sequentially executes the registered components in such a way that the component executor stores information about the components to be executed in the memory, executes the registered components and deletes the information stored in the memory when the execution of the registered components has been completed.

5. The apparatus of claim 1, wherein:
    the component executor further comprises the counter having a preset value that is incremented if information about a component is present; and
    the new thread allocated by the thread pool determines that the component corresponding to the information present in the memory has failed when the preset value of the counter reaches a value equal to or higher than a preset threshold value.

6. The apparatus of claim 1, wherein when a plurality of component executors exists, a priority and period set for each of the component executors are utilized by a scheduling policy of the OS.

7. A method of executing components based on a thread pool, the method comprising:
    creating a component executor having a set priority and period;
    registering components having the set priority and period set for the component executor;
    sequentially executing the registered components when a thread is allocated by the thread pool for a robot; and
    returning the allocated thread when the execution of the registered components has been completed,
    wherein if the execution of the registered components did not complete within the set period:
        incrementing a counter and then returning the allocated thread;
        checking a value of the counter using a new thread when the new thread is allocated to the component executor;
        determining a failed component based on the information stored in internal memory when the value of the counter is a value equal to or higher than a preset threshold value:
        creating, in response to the determining of the failed component, a new component executor having the set priority and the set period using the new thread and transferring the components, and registering the components other than the failed component with the new component executor; and
        deleting the transferred components by the component executor and executing the registered components using the new component executor.

8. The method of claim 7, further comprising:
    the component executor setting a timer for an OS based on the set period; and allocating the thread to the component executor when the timer is driven.

9. The method of claim 7, wherein said sequentially executing the registered components comprises:
- storing information about each component to be executed in the internal memory; and
- deleting the information stored in the internal memory when execution of the component corresponding to the information stored in the internal memory has completed.

10. The method of claim 7, further comprising, if the execution of the registered components did not complete within the set period, incrementing the counter by a preset value.

* * * * *